United States Patent [19]

Hundstad et al.

[11] 4,064,465
[45] Dec. 20, 1977

[54] LASER CAVITIES WITH GAS FLOW THROUGH THE ELECTRODES

[75] Inventors: Richard L. Hundstad, Pittsburgh, Pa.; Owen Farish, Bearsden, Scotland

[73] Assignee: Westinghouse Electric Corporation, Pittsburgh, Pa.

[21] Appl. No.: 648,688

[22] Filed: Jan. 13, 1976

Related U.S. Application Data

[63] Continuation of Ser. No. 365,389, May 30, 1973, abandoned.

[51] Int. Cl.$^2$ .................................... H01S 3/097
[52] U.S. Cl. ............................................ 331/94.5 PE
[58] Field of Search .............. 331/94.5 G, 94.5 PE, 331/94.5 D; 330/4.3

[56] References Cited

U.S. PATENT DOCUMENTS 3,886,479  5/1975  Pearson ................. 331/94.5 PE

OTHER PUBLICATIONS

Alcock, described as "Canadian, 'tea'" in Laser Focus, July 1972, p. 30 (p. 18 included).
Laser Focus Apr. 1962, "Spotlight on Montreal" pp. 22-23, and pp. 34-35.

Primary Examiner—William L. Sikes
Attorney, Agent, or Firm—M. P. Lynch

[57] ABSTRACT

A uniform field electrode arrangement for exciting a laser gas in a high pressure pulsed gas laser apparatus so constructed to facilitate discharge initiation and smooth laminar gas flow. The geometry of the electrode assembly provides for laminar gas flow through the discharge volume providing an optically homogeneous lasing medium. Discharge initiation for pulsed operation is achieved using, for example, ultraviolet irradiation of the electrode assembly, corona discharge devices and radioisotope irradiation of the electrode assembly. Independent of the type of initiatory discharge device used, the geometry of the assembly allows for efficient supply of initiating electrons to the discharge gap without interference with smooth gas flow through the optical cavity. Mesh electrodes can be used to facilitate gas flow in a direction parallel with the direction of electrical discharge.

8 Claims, 9 Drawing Figures

LASER CAVITIES WITH GAS FLOW THROUGH THE ELECTRODES

This is a continuation of application Ser. No. 365,389 filed May 30, 1973, now abandoned.

BACKGROUND OF THE INVENTION

1. Field of the Invention

This invention relates to high pressure pulsed gas laser systems which require discharge initiation and gas flow to stabilize the glow discharge. It is specifically related to electrode assembly configurations which enhance smooth gas flow with no large scale turbulence while allowing efficient discharge initiation.

2. Description of the Prior Art

Prior electrically excited gas laser systems operated at high pressure have in many instances utilized other than uniform-field type electrode configurations. A common transversely excited atmospheric laser found in prior art literature uses discharge electrodes in a laser cavity which include a number of pin cathodes set opposite a continuous bar anode. This type of configuration has the advantage that under chosen conditions of stored energy in the pulse generator, it is possible to create a plurality of transient high current discharges between the individual pins and the continuous bar anode without an independent source of electrons to initiate the discharge. By proper spacing of the pins, the discharges merge into a homogeneous and diffuse across the entire interelectrode region. In this type of a system, the electrons for the initiation of the glow discharge are provided by field emission at the ends of the cathodic pins. The current is amplified by collisional ionization in the high field region of the gap near the pins providing large numbers of free electrons which undergo exciting collisions aand populate the upper laser levels of the gas medium. This particular electrode geometry requires a very rapid current rise time and a short glow duration in order to prevent constricted high temperature spark or arc discharge which would terminate laser action.

In an electrode assembly utilizing a non-uniform field electrode configuration, uneven distribution of current densities can result in damage by heating to the electrodes and cause discharge instabilities. Also, with non-uniform field excitation, parts of the gas volume may not be properly excited causing losses by absorption. Resultant inhomogenity of the glow discharge can have adverse effects upon the optical characteristics of the total laser system.

In other gas laser systems in which the electrode assembly has been configured to provide a uniform field discharge region, there has been no provision for smooth laminar gas flow. One prior art gas laser system utilizes auxiliary electrodes adjacent the main electrical discharge electrodes to trigger the discharge. The main electrodes, however, are positioned in an insulating enclosure with the auxiliary electrodes attached to the outer surface of the enclosure. Such a configuration does not allow for gas flow within the discharge region.

However, to operate a gas laser in a pulsed mode utilizing a uniform field electrode configuration, requires smooth laminar gas flow without major gas turbulence and some separate means for supplying initiatory electrons to the discharge region. Thus, the electrode assembly must be designed to both allow for laminar flow of the lasing gas and for efficient injection of initiatory electrons into the discharge region without interruption of the gas flow.

SUMMARY OF THE INVENTION

The present invention is a high pressure pulsed gas laser system which has an envelope substantially enclosing an optical cavity which is comprised of an electrode assembly arranged in a uniform field configuration, some means for flowing the laser gas at high pressure, generally being greater than 100 Torr, through the electrode assembly, discharge initiation means adjacent the electrode assembly, and pulsing means connected to the electrode assembly and controlling the discharge initiation means to electrically excite the gas medium, thereby causing lasing action in the optical cavity. The laser system is constructed to facilitate smooth gas flow through the optical cavity while allowing for efficient injection into the cavity of initiatory electrons from the discharge initiation means.

BRIEF DESCRIPTION OF THE PREFERRED EMBODIMENTS

Figure 1A:
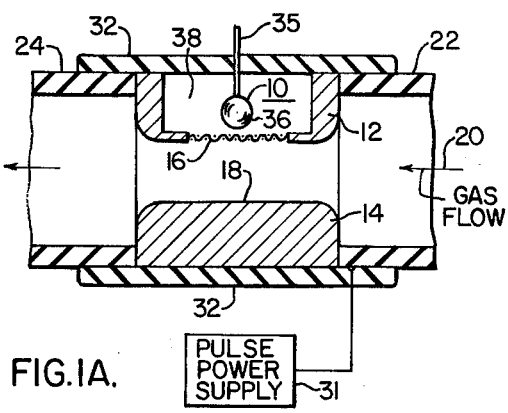
FIGS. 1a and 1b are sectional views of one embodiment of the present invention utilizing an ultraviolet lamp to initiate the glow discharge.
Figure 1B:
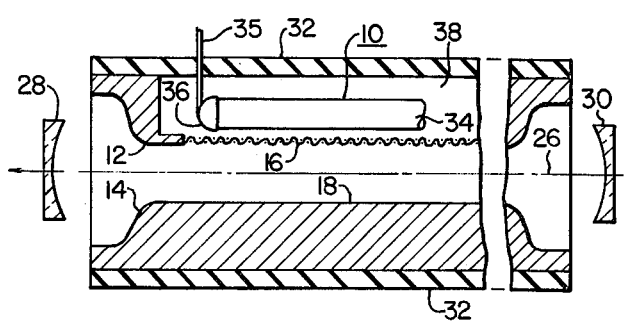

In FIGS. 1a and 1b there is shown one embodiment of the present invention utilizing an ultraviolet lamp 10 as a discharge initiation device set behind electrode 12. Electrodes 12 and 14 are configured with planar surface portions 16 and 18, respectively, positioned parallel and opposite one another to define a uniform field region therebetween. The planar portion 16 of electrode 12 is of a wire mesh construction transmissive to the radiation from lamp 10. The edges of the electrodes 12 and 14 are profiled to eliminate edge effects in the uniform field while providing a nozzle profile to enhance smooth gas flow. The gas flow is also laminar to the degree that major turbulence which would effect the optical homogeneity and efficiency of the device is absent. The term "laminar" as used herein is not meant to mean the complete absence of such localized turbulence which would have no significant effect on laser operation.

The direction of gas flow as shown by arrow 20 is transverse to the direction of electrical discharge between electrodes 12 and 14. A suitable lasing gas at high pressure is pumped into the discharge region through inlet duct 22 and from the discharge region through outlet duct 24. Recirculating means (not shown) typically includes a heat exchanger for cooling the gas and pump to establish the velocity of the gas through the excitation region to the desired speed for the particular gas medium and electrode geometry.

As shown in FIG. 1b, the laser axis 26 is parallel to and between the planar surface portions 16 and 18 of the electrodes 12 and 14, respectively. The optical cavity of the laser system is defined by reflective optical elements 28 and 30, located at either end of the electrode assembly comprised of electrodes 12 and 14. In a typical arrangement, one reflective element 28 is partially transmissive and the other element is totally reflective.

In a concave region 38 of electrode 12 enclosed by a portion of envelope wall 32 an ultravoilet lamp 10 is positioned outside the active optical cavity with its longitudinal axis parallel to the laser axis 26 of the system. The lamp 10 comprises a cylindrical envelope 34 on the ends of which are caps such as 36 including the electrical terminal 35. Customarily, the lamp 10 will be pulsed to obtain the necessary ultraviolet radiation to irradiate planar surface portion 18 of electrode 14 through the mesh screen portion 16 of electrode 12. The ultraviolet radiation causes generation of electrons by photoemission processes and other bulk ionization processes in the gas. The electrode 14 is connected to a pulse power supply 31 for supplying pulsed energy to the discharge gap between electrodes 12 and 14 which may be synchronized with the pulsed ultraviolet lamp 10.

By using the electrode geometry of FIGS. 1a and 1b with the ultraviolet lamp 10 recessed behind the screen surface portion 16 of electrode 12, gas flow is unimpeded through the optical cavity and in particular is smooth and laminar through the excitation region between the electrodes 12 and 14. There is no flow of gas in cavity 38, the ultraviolet lamp 10 being removed from the stream of gas flow out of the active optical cavity.

Figure 2A:
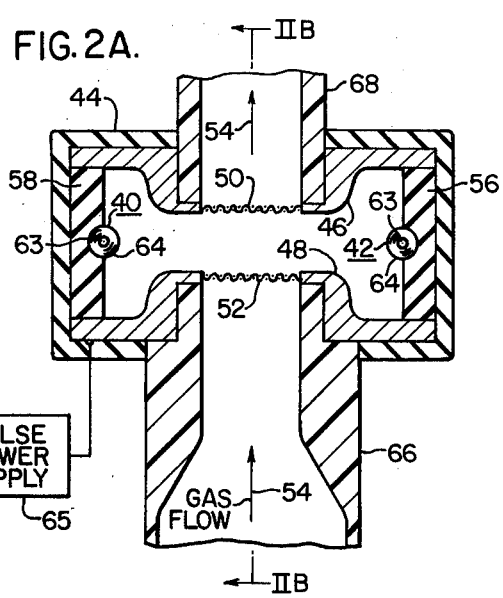
FIGS. 2a and 2b are sectional views of another embodiment of the present invention with gas flow through screen electrodes and utilizing two ultraviolet lamps for discharge initiation.
Figure 2B:
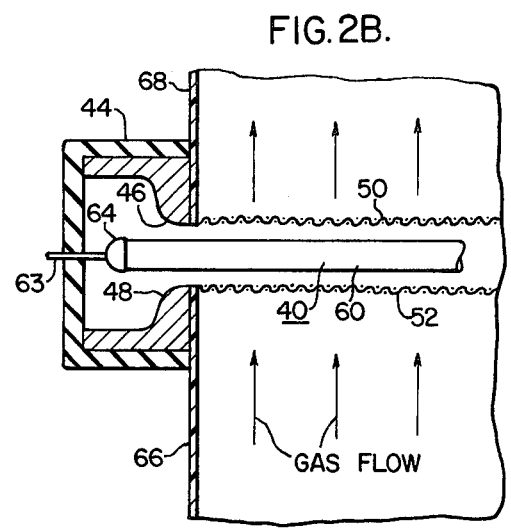

In FIGS. 2a and 2b, two ultraviolet lamps 40 and 42 are positioned out of the direct flow of gas outside the active optical cavity but within the envelope volume. An envelope 44 encloses the electrode assembly comprised of electrodes 46 and 48. Each of the electrodes 46 and 48 have screen mesh portions 50 and 52, respectively, which are substantially planar parallel one to the other defining a uniform region therebetween. Gas flow is in a direction shown by arrows 54 through the electrode sreen mesh portions 50 and 52.

The ultraviolet lamps 40 and 42 used to irradiate the electrode 48, and specifically the mesh screen portion 52, with ultraviolet radiation are positioned on either side of the discharge region lying between electrodes 46 and 48. The longitudinal axes of lamps 40 and 42 are essentially parallel to the planar screen portions 50 and 52 of electrodes 46 and 48. They are rigidly held in position in insulating wall portions 56 and 58 so as to expose surface 52 to the radiation through the cylindrical glass envelopes 60 and 62 of lamps 40 and 42, respectively. End caps 64 having a terminal portion 63 thereon are customarily connected to a power source so as to obtain the necessary high intensity ultraviolet radiation to generate electrons by photoemission processed from the surface of mesh screen 52 and by other bulk ionization processes in the gas.

The electrode 48 is connected to pulse power supply 65 which supplies energy to the discharge region between screen portions 50 and 52 to sustain the transient pulse glow discharge.

Gas flow is in a direction through the screen portions 50 and 52 of the electrode assembly in a direction indicated by arrow 54 through appropriate ducts such as 66 and 68. Gas flow at a chosen velocity and temperature may be maintained by means of pumping and heat exchange means not shown in the figures.

It will further be understood by one skilled in the art that optical reflective elements can be placed at either end of the electrode assembly to define an otptical resonant cavity as in the embodiment of FIG. 1b.

Figure 3A:
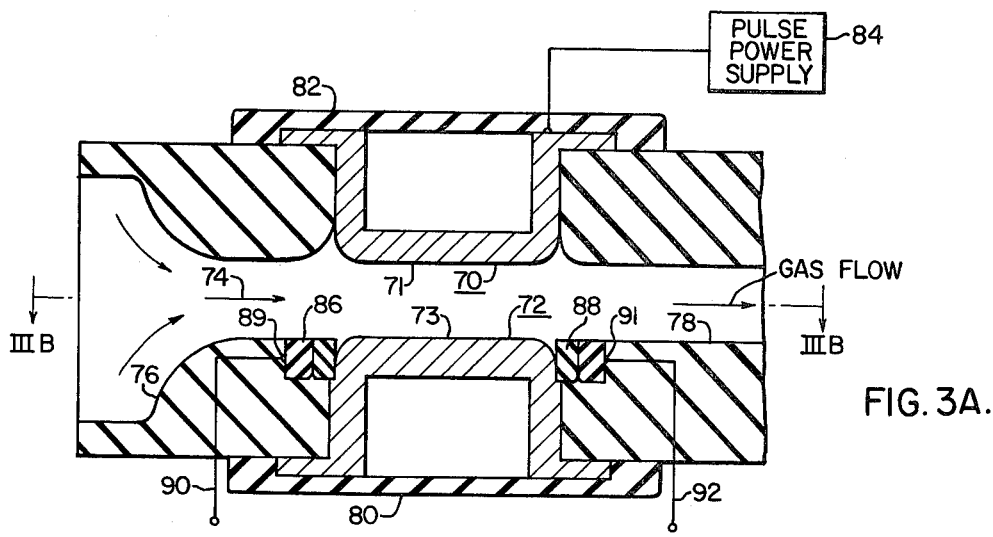
FIGS. 3a and 3b are sectional views of another embodiment utilizing corona discharge gaps adjacent the main electrode assembly to initiate the glow discharge.
Figure 3B:
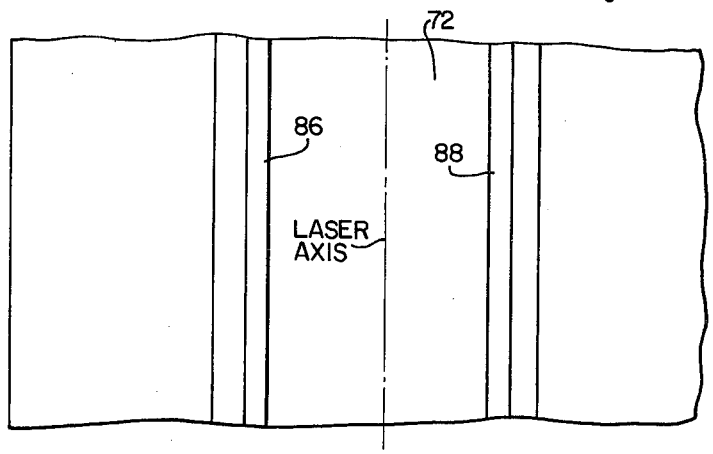

In FIGS. 3a and 3b another embodiment of the present invention is shown in which dielectric slab electrode pairs 86 and 88 are pulsed so as to prduce a corona discharge in a narrow gap to irradiate the electrode surface by photons from the corona discharge. Other bulk ionization processes also occur to produce additional free electrons in the discharge gap region. Main electrodes 70 and 72 are positioned opposite one another with planar surface portions 71 and 73 parallel. The electrode surfaces can be profiled so as to eliminate edge distortion to the uniform electric field while providing a nozzle profile to sustain a smooth flow of gas.

Gas flow indicated by arrow 74 is transverse to the direction of discharge between electrodes 70 and 72. A nozzle profile in inlet duct 76 causes streamlined flow and increased velocity through the discharge region between electrodes 70 and 72. Outlet ductwork 78 cycles the gas to pumping and heat exchange means (not shown) and then back to the inlet duct 76.

The electrode assembly is partially enclosed by envelope walls 80 and 82. Electrode 70 is connected to a pulse power supply 84 by means of which the main gap region is pulsed.

The discharge initiation means are two pairs 86 and 88 of slab electrodes made of a high dielectric constant material arranged adjacent and parallel to the surface portion of electrode 72. Each set 86 and 88 of slab electrodes is positioned in an indented part of the insulated ducts 76 and 78, respectively. The electrode pairs 86 and 88 which, for instance, can be titanium dioxide (rutile), run the length of the electrode 72 as can more clearly be seen in FIG. 3b. One slab electrode of each dielectric pair is connected from terminals 89 and 91 through leads 90 and 92 to electrode 70 so that they are pulsed synchronously with the main gap region between electrodes 70 and 72. The slab electrodes of each pair 86 and 88 can touch at their interface as shown in FIGS. 3a and 3b or can define a narrow gap region therebetween.

The operation of the dielectric electrode sets as discharge initiators is more fully explained in copending application Ser. No. 365,391, filed 5-30-73, now U.S. Pat. No. 3,935,547 by the same inventors and assigned to the same assignee as the present application.

In operation, corona discharges are generated at the interface of the dielectric slab electrodes 86 and 88 such that the surface portion of electrode 70 is irradiated with photons producing initiatory electrons at the surface of electrode 70 through a photoemission process. Some gas ionization effects may also generate additional electrons. A transient pulse glow discharge can then be maintained between electrodes 70 and 72 by means of the application of pulses to the electrode 70 from the pulse power supply 84. By setting the two dielectric slab electrode sets 86 and 88 into the recessed portions of ducts 76 and 78, smooth laminar gas flow through the discharge region is preserved. Using this electrode configuration, laminar gas flow to sonic velocities can be maintained with no major turbulence in the discharge region. Good optical homogeneity of the laser medium is thereby maintained and the pulsed discharge is stabilized.

Figure 4:
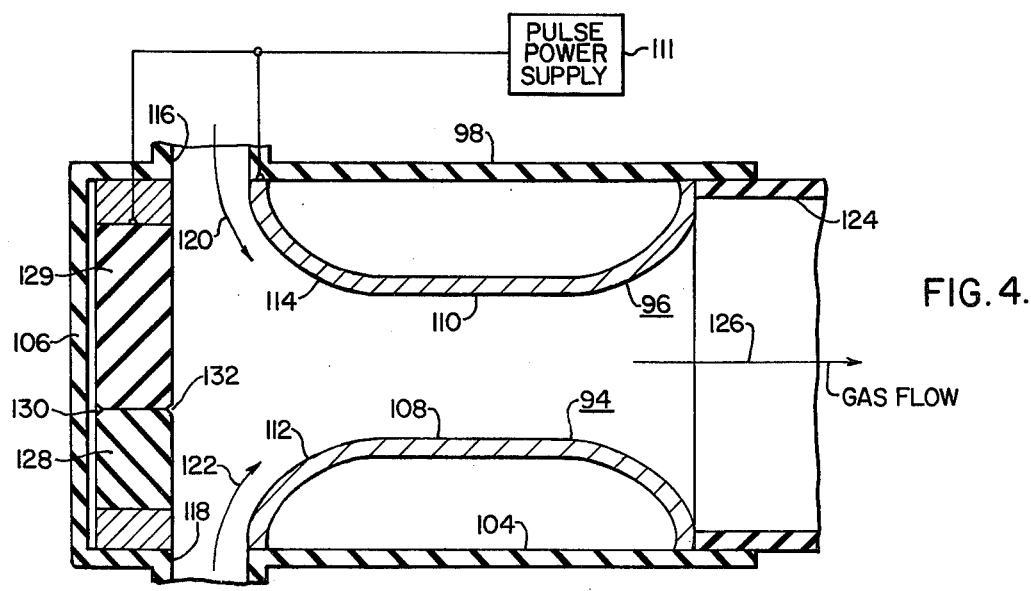
FIG. 4 is a cross-sectional view of another embodiment of the present invention.

In FIG. 4, a partial section of an electrode assembly is shown in which dielectric slab electrodes 128 and 129 are used to provide initiatory electrons to the gap region, but set in a different configuration than that shown in FIGS. 3a and 3b. Electrodes 94 and 96 are positioned within an envelope having wall portions 98, 104 and 106. The electrodes 94 and 96 have surface portions 108 and 110, respectively, which are substantially planar and parallel one to the other. Surface portions 112 and 114 of electrodes 94 and 96 respectively have been constructed with a nozzle profile to facilitate laminar flow of gas into the discharge region between surfaces 108 and 110.

Gas flow is through two inlet orifices 116 and 118 in the general direction of arrows 120 and 122, respectively. The orifices 116 and 118 run the length of the electrodes 94 and 96 so that the gas volumetric flow is uniform along the entire length of the electrode assembly. Gas flow out of the uniform field region between surface portions 108 and 110 is through outlet orifice 124 in the direction indicated by arrow 126. As has been previously described, continuous gas flow can be maintained by appropriate pumping and heat exchange means.

Set adjacent the gas inlet orifices 116 and 118 are dielectric slab electrodes 128 and 129 in a contiguous relationship at interface 130. The slab electrodes 128 and 129 can either abut at the interface 130 or define a narrow gap region herebetween. The edges of the slabs 128 and 129 are profiled at interface region 130 as is indicated at 132 so as to facilitate irradiation of the planar surface region 110 of electrode 96 with ultraviolet radiation. Free electrons for discharge initiation are produced by photoemission and photo ionization processes.

The operation of the embodiment shown in FIG. 4 is quite similar to that of the embodiment of FIGS. 3a and 3b. Both the dielectric slab electrode 129 and electrode 96 are connected to a pulsing source 131 which operates to pulse both the gap region 130 to generate ultraviolet radiation of the electrode 96 and pulse the main discharge region between surface portions 108 and 110 of electrodes 94 and 96, respectively. By positioning the dielectric slab electrodes 128 and 129 to one side of the electrode assembly, the gas flow through inlet orifices 116 and 118 is unimpeded. Consequently, smooth laminar flow is experienced in the region between the planar surface portions 108 and 110. Good optical homogeneity of the gas laser medium is achieved for laser action when the appropriate optical reflective elements are utilized in conjunction with the described electrode assembly. Optics can be added as shown in FIG. 1b.

Figure 5:
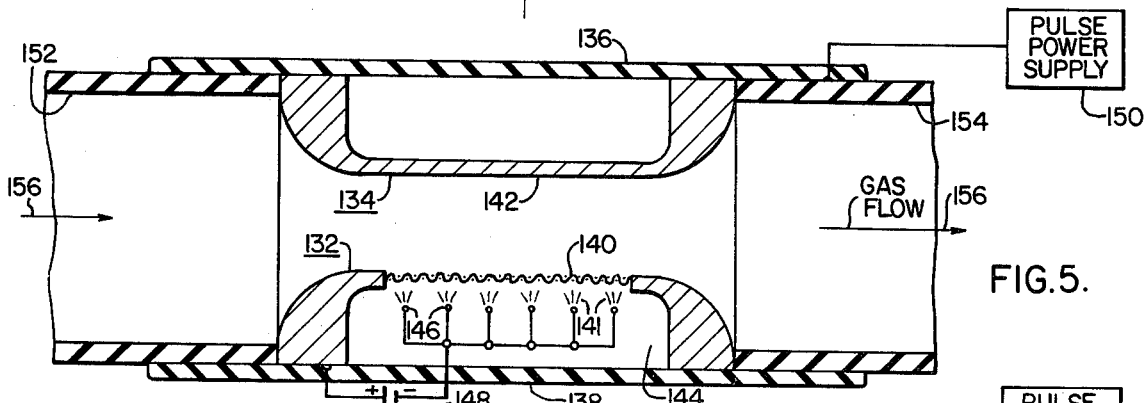
FIG. 5 is a cross-sectional view of another embodiment in which initiatory electrons are produced by spark discharge between corona wires and a screen electrode.

Initiatory electrons can also be supplied directly from a corona source. This type of action is shown in the device of FIG. 5. Two electrodes 132 and 134 are positioned within an envelope having wall portions 136 and 138. Electrode 132 has a planar wire portion 140 set opposite and parallel to solid planar surface 142 of electrode 134. In a cavity region 144 behind the mesh surface portion 140, a series of parallel corona wires 146 is positioned adjacent and equidistant from planar mesh surface portion 140. The corona wires are negatively biased with respect to electrode 132 by means of d.c. source 148. Electrode 134 is connected to a pulse power supply 150. When pulses are applied to the gap region between the surfaces 140 and 142, corona discharges 141 are initiated behind the mesh screen portion 144 between the corona wires 146 and the mesh 140. The generated corona discharges 141 produce free electrons along the surface of mesh 140 which aid in initiation of transient pulse flow discharge in the main gap region. With appropriate optics such as provided in the embodiment of FIG. 1b, the laser gas is excited to upper lasing levels and lasing action takes place within the device.

Gas flow into the discharge region is through inlet orifice 152 and out through orifice 154 in the direction indicated by arrows 154. The corona wires 146 are not exposed directly to the gas flow, and there is no consequent obstruction to essentially laminar flow.

Figure 6:
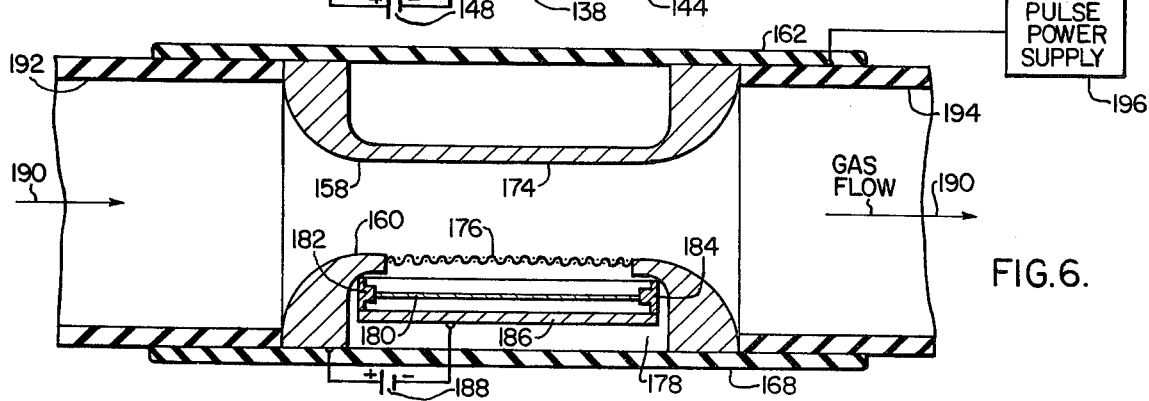
FIG. 6 is a cross-sectional view of another embodiment of the present invention using radioisotope irradiation of the electrode assembly for initiating the glow discharge.

In Fig. 6 an embodiment of the present invention is shown in which a radioisotope is used to provide free electrons by alpha particle bombardment. Main electrodes 158 and 160 are set within an envelope having wall portions 162 and 168. Planar surface portion 174 of electrode 158 is positioned parallel to the wire mesh planar surface portion 176 of electrode 160. The volume between the planar surface portions 174 and 176 define a substantially uniform field region.

Set behind the wire mesh surface portion 176 and within cavity 178 defined by wall portion 168 and the interior surfaces of electrode 160 is an alpha particle source 180. A typical alpha particle source used in this configuration is Americium-241. The alpha particle source is mounted in insulating brackets 182 and 184 a few centimeters from the screen mesh portion 176. If Americium-241 foil is used as the alpha particle source, short range (approximately 3 centimeters at atmospheric pressure), alpha particles are produced, and consequently, no special precautions need be taken in handling the gas.

A repeller plate 186 is mounted below the alpha particle source 184 and held in place by the end brackets 182 and 184 so as to repel particles into the discharge gap region between surface portions 174 and 176 of electrodes 158 and 160, respectively. The repeller plate 186 is held at a low bias voltage with respect to electrode 160 by means of d.c. supply 188. The electrons generated by alpha particle collision will tend to flow into the main gas flow region as a result of the polarity of the field.

Gas flow is in a direction transverse to the uniform electric field between electrodes 158 and 160 as indicated by arrows 190. Inlet and outlet orifices 192 and 194, respectively, are located on each side of the electrode assembly comprised of electrodes 158 and 160 and have a lateral dimension equivalent to the length of the total electrode assembly. The profiling of the electrode edges aid both in eliminating edge effect distortion in the electric field and also in enhancing smooth gas flow.

As in the previous embodiments, the main electrode gap between surface portions 174 and 176 is pulsed by a pulse power supply 196. The electrons injected into the gap region by alpha particle collision initiate the discharge which is then sustained by the power dumped into the gap region by the pulse power supply 200, thereby resulting in transient pulse glow discharge action.

With the proper optical elements to define an optical cavity, as was shown in FIGS. 1a and 1b, the device of FIG. 6 can operate to raise the laser gas medium to upper lasing levels resulting in lasing action.

The use of an alpha particle source as in the configuration of FIG. 6 insures a steady supply of electrons at the surface portion 176 of the electrode 160. However, the electrons are produced in pulses of approximately $10^5$ electrons in intervals of approximately 100 microseconds at the surface of the Americium-241 foil. The burst of electrons is diffused into a quasi-steady supply by the time they reach the surface portion 176 of electrode 160.

The several embodimens disclosed above have the general advantages of a uniform field discharge cavity. By providing an adequate supply of electrons by the use of various discharge initiation means, a stable and optically homogeneous glow discharge is achieved. The particular configuration and arrangement of the electrode assembly in each embodiment facilitates an essentially laminar gas flow while allowing for a sufficient supply of initiatory electrons in the discharge gap region.

We claim:

1. A high pressure pulsed gas laser apparatus having an optical cavity and an envelope volume substantially enclosing the optical cavity, comprising:
    an electrode assembly positioned within said envelope volume including first and second electrodes arranged in a substantially uniform field configuration and defining a discharge gap region therebetween,
    means for flowing a laser gas at high pressure through a first portion of said envelope volume including said discharge gap region in a direction orthogonal to the optical axis of said optical cavity,
    said electrode assembly further including discharge initiation means adjacent said first and second electrodes in a second portion of said envelope volume for supplying initiatory electrons into said discharge gap region by means of photoemission and bulk gas ionization processes,
    said electrode assembly being so arranged and constructed that said gas flow is substantially laminar to sustain a uniform an homogeneous discharge in said discharge gap region, and
    pulsing means operatively connected to said electrode assembly to supply energy to said discharge volume for sustaining a glow discharge and to control said discharge initiation means for supplying electrons to said discharge gap region.

2. The high pressure gas laser apparatus of claim 1 wherein said discharge initiation means includes an ultraviolet lamp so positioned within said envelope to irradiate a surface of said first electrode for generating electrons.

3. The high pressure gas laser apparatus of claim 2 wherein said second electrode has a concave surface portion spanned by a planar mesh screen and wherein said ultraviolet lamp is positioned between said concave surface portion and said planar mesh screen.

4. A high pressure pulsed gas laser apparatus having an optical cavity and an envelope volume substantially enclosing the optical cavity, comprising:
    an electrode assembly positioned within said envelope volume including first and second electrodes, said first and second electrodes including mesh portions which are substantially planar and parallel to one another and defining a discharge gap region therebetween,
    means for flowing a laser gas through said mesh portions of said first and second electrodes, said flow being substantially perpendicular to said mesh portions,
    said electrode assembly further including discharge initiation means adjacent said first and second electrodes for supplying initiatory electrons into said discharge gap region by means of photoemission and bulk gas ionization processes, and
    means operatively connected to said electrode assembly to supply energy to said discharge volume for sustaining a glow discharge and to control said discharge initiation means.

5. The high pressure gas laser apparatus of claim 4 wherein said discharge initiation means includes a first and second ultraviolet lamp so positioned in said first portion of said optical cavity to irradiate a surface of said first electrode for causing photoemission of electrons.

6. A high pressure pulsed gas laser apparatus having an optical cavity and an envelope volume substantially enclosing the optical cavity, comprising:
    an electrode assembly positioned within said envelope volume including first and second electrodes arranged in a substantially uniform field configuration and defining a discharge gap region therebetween,
    means for flowing a laser gas through a first portion of said envelope volume including said discharge gap region in a direction orthogonal to the optical axis of said optical cavity,
    said electrode assembly further including discharge initiation means adjacent said first and second electrodes in a second portion of said envelope volume for supplying the initiatory electrons into said discharge gas region,
    pulsing means operatively connected to said electrode assembly to supply energy to said discharge volume for sustaining a glow discharge and to control said discharge initiation means for supplying electrons to said discharge gap region, said discharge initiation means including at least one rutile slab electrode pair positioned contiguous to said second electrode for producing corona discharges when pulsed by said pulsing means to irradiate said first electrode with ultraviolet radiation, said electrode assembly being so arranged and constructed that said gas flow is substantially laminar to sustain a uniform discharge in said discharge gap region.

7. A high pressure pulse gas laser apparatus having an optical cavity and an envelope volume substantially enclosing the optical cavity, comprising:
    an electrode assembly positioned within said envelope volume including first and second electrodes arranged in a substantially uniform field configuration and defining a discharge gap region therebetween,
    means for flowing a laser gas through a first portion of said envelope volume including said discharge gap region in a direction orthogonal to the optical axis of said optical cavity,
    said electrode assembly further including discharge initiation means adjacent said first and second electrodes in a second portion of said envelope volume for supplying initiatory electrons into said discharge gap region,
    said first and second electrodes being profiled in a tapered nozzle-like configuration to enhance rapid laminar flow through the discharge volume and wherein said discharge initiation means is located adjacent the broadest cross section of said tapered nozzle-like configuration, and means operatively connected to said electrode assembly to supply energy to said discharge volume for sustaining a glow discharge and to control said discharge initiation means for supplying electrons to said discharge gap region.

8. The high pressure gas laser apparatus of claim 7 wherein said discharge initiation means includes a rutile slab electrode pair for generating a corona discharge to irradiate a surface of said first electrode with ultraviolet radiation for generating electrons.

* * * * *